United States Patent [19]

Azer

[11] Patent Number: 5,481,592
[45] Date of Patent: Jan. 2, 1996

[54] SYSTEM FOR AUTOMATICALLY COMPLETING CALLS TO MOBILE TELEPHONE SUBSCRIBERS

[75] Inventor: Mikhail S. Azer, Manalapan, N.J.

[73] Assignee: AT&T Corp., Murray Hill, N.J.

[21] Appl. No.: 318,452

[22] Filed: Oct. 5, 1994

[51] Int. Cl.⁶ ..................................................... H04Q 7/38
[52] U.S. Cl. ........................... 379/58; 455/12.1; 455/13.1
[58] Field of Search ................................. 379/58, 59, 60; 455/12.1, 13.1, 13.3, 33.1, 33.2, 54.1, 54.2

[56] References Cited

U.S. PATENT DOCUMENTS

| 4,737,978 | 4/1988 | Burke et al. | 379/60 |
| 5,173,933 | 12/1992 | Jabs et al. | 379/58 |
| 5,410,728 | 4/1995 | Bertiger et al. | 455/13.1 |

Primary Examiner—Dwayne D. Bost
Attorney, Agent, or Firm—Michael B. Johannesen

[57] ABSTRACT

A system and method which can complete a call to a specific Inmarsat subscriber ship. When a call arrives at a gateway switch, a test is made to determine if the called ship is in the gateway's local database. If it is, then a current region code is retrieved from the database and substituted for the dialed code for call processing. A call is then placed to the ship. If the call can be completed, the call is processed normally. If the call cannot be completed because the ship cannot be located in the selected region, then the call is automatically retried to each of the other regions, in a predetermined order. The local database in the gateway switch will be updated whenever a call is completed whether the call was originated or terminated at the mobile terminal.

13 Claims, 2 Drawing Sheets

SYSTEM FOR AUTOMATICALLY COMPLETING CALLS TO MOBILE TELEPHONE SUBSCRIBERS

TECHNICAL FIELD

This invention relates to a system for completing calls to mobile telephones, more particularly to telephones on ships at sea, and, more specifically, to a system for delivering calls to ships as the ships move from region to region.

BACKGROUND OF THE INVENTION

Many ocean-going vessels now have telephones systems that may call to and be called from any point in the world. One such telephone system is the International Maritime Satellite ("Inmarsat") systems. The Inmarsat organization is a partnership of numerous countries which manages global communications to and from ships, as well as to and from land-based vehicles and aircraft. Because wireless communication is generally line-of-sight and, thus, limited by the earth's curvature, Inmarsat uses satellites to provide wireless connection between any two points on the earth. As will be explained further, below, each of the satellites covers a predefined area of the globe called "ocean regions." An Inmarsat customer may then be reached from anywhere in the world, provided the calling party knows the region in which the Inmarsat customer is located.

In order to call an Inmarsat maritime subscriber, a person dials (from virtually any phone in the world), an access code (AC), the service code (SC), then a 6–9-digit ship identification number. The world is divided into four ocean regions, each of which is designated by an access code, 87X, wherein X equals 1 through 4; in many ways these access codes resemble country codes used for international calls. The regions are: Atlantic Ocean Region-East (871), Atlantic Ocean Region-West (874), Pacific Ocean Region (872), and Indian Ocean Region (873). Currently, the caller has to dial the correct access code of the region where the called ship is located, otherwise the call cannot be completed.

One proposal to insure that all calls can be completed to ships at sea requires a database for keeping track of the location of each ship. Such a database could be a collection of interconnected databases, one local to each switch in the Inmarsat system, or it may be one common database which serves all switches worldwide. The location of each ship would be contained in the database, which location would be updated periodically. The database may be updated by each ship reporting when it crosses a boundary from one region to another, or, alternatively, the database may page each ship and each ship would report its respective location. However, such centralized or interconnected databases are known to be relatively unreliable, because a fault in one small subsystem can cause all information requests to be blocked. Furthermore, such databases would have to have upwards of 500,000 detailed entries, and would, thus, be very memory-consuming and time-intensive in maintenance.

Therefore, a problem in the art is that there is no system for completing calls to a ship at sea as it moves from ocean region to another ocean region.

SUMMARY OF THE INVENTION

This problem is solved and a technical advance is achieved in the art by a system and method which can complete a call to a specific ship, given its expected ocean region and its ship identification number. Each gateway switch has a local database in which it stores the identity of the ships for which it has a region code (created by some previous operation). When a call arrives at a switch (called a "gateway switch") for a ship on the Inmarsat system, a test is made at the gateway switch to determine if the called ship is in its local database. If it is, then a the stored region code is retrieved for call processing. This region code is presumed to be current, and a call is then placed to the ship, using this region code. If the call can be completed, the call is processed normally. If the call cannot be completed because the ship cannot be located in the selected region, then a call is tried to each of the other regions, in a predetermined order. Advantageously, the order in which the regions are tried may be related to the last location of the ship and the home region of the ship. If the ship is located, the database in the gateway switch is updated with the current region of the ship and the call proceeds normally.

The database in each switch may also be updated each time a call is made from a ship, using the access code of the ocean region from which the call is made. (This code is included in the calling number when a call is originated from a ship.) However, because the next call is likely to be made to or from the ship before it leaves the current region, there is no need to update the local databases at any other gateway switches. Accordingly, the local databases are not interconnected or updated by each other in any way.

Many other wireless systems may also be able to benefit from this invention. Systems or subsystems of mobile systems, including, in particular, systems with a limited number of regions and subscribers who move unpredictably among the regions. Possible examples are private mobile systems using low power (hence the need for multiple regions) for police, security and ambulance services. Further, the invention is not limited to satellite transmission; the invention could be used in systems employing land-based transmitter-receiver stations.

BRIEF DESCRIPTION OF THE DRAWING

A more complete understanding of the invention may be obtained by a consideration of the following description in conjunction with the drawings in which.

DETAILED DESCRIPTION

Figure 1:
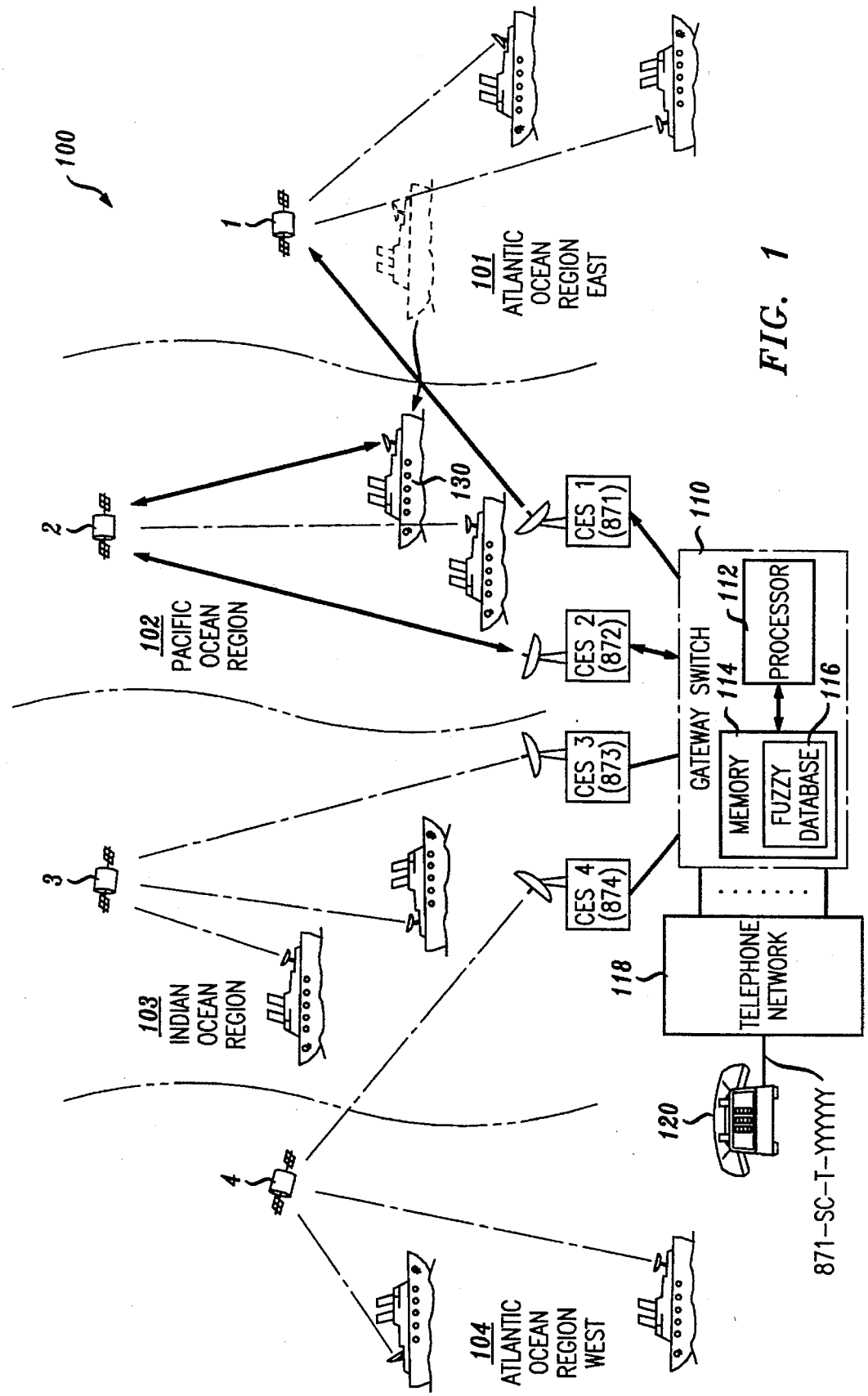
FIG. 1 is a block diagram showing ship locating according to an exemplary embodiment of this invention.

Turning now to FIG. 1, FIG. 1 is a diagrammatic illustration of the principles of this invention, wherein a diagram of the Inmarsat Maritime telephone system 100 is shown. According to the Inmarsat system, the world is divided into four ocean regions: Atlantic Ocean Region-East 101, Pacific Ocean Region 102, Indian Ocean Region 103, and Atlantic Ocean Region-West 104. Calls to and from each region are made through its own satellite, i.e., satellites 1–4, which are in geostationary orbit. Each satellite is in communication with several coast earth stations represented in FIG. 1 by (CES) 1–4, which provides the land-to-satellite link to other communications systems, and vice versa. The CES's of each region have a unique access code. Any CES 1 serves satellite 1 and has the access code 871; any CES 2 serves satellite 2 and has the access code 872, and so forth. For purposes of describing this invention, one CES is illustrated in each region and is referred to as CES 1–4. The CES's are in communication with a gateway switch 110. In actuality, CES 1–4 are in communication with many systems (not shown for clarity). Gateway switches, such as 110, are commonly used to communicate from one country to another; hence, the term "gateway." These switches, also used in the Inmarsat system, connect a call from a country (or from a gateway switch in another country) to the Inmarsat system. For purposes of describing the details of this invention, gateway switch 110 comprises a 5ESS® switch, as manufactured by AT&T and described in AT&T Technical Journal, volume 64, number 6, July/August, 1985, pages 1303–1564. Gateway switch 110 routes the call to a selected CES 1–4, depending upon the dialed region code. The selected CES then uplinks to its corresponding satellite 1–4.

For purposes of describing the invention, gateway switch 110 includes a processor 112 and memory 114, in which the exemplary embodiment of this invention may operate. Processor 112 uses memory 114 to store operational programs, according to an exemplary embodiment of this invention, and also a database, described as a "fuzzy" database 116 (because of its deliberately imprecise nature), as will be described more fully below. Gateway switch 110 is connected to telephone network 118, as is known in the art. Telephone network 118 comprises a plurality of local and long distance switches and transport means, as is known in the art, and will, therefore, not be further described herein. An exemplary telephone 120 is connected to telephone network 118.

According to the prior art, when the user of telephone 120 wants to communicate with the telephone on ship 130, the user dials the region code for the region in which the ship is supposed to be located. In this example, the ship is supposed to be in the Atlantic Ocean Region-East, which has an access code of 871. Therefore, the user of telephone 120 dials the digits 871, then the service code (SC), then a 6–9 digit ship number. This connection attempt is passed through telephone network 118, which, because it recognizes the Inmarsat code (871), forwards the call to gateway switch 110. In response to access code 871, gateway switch 110 routes the call to CES 1, which in turn attempts the call through satellite 1. If ship 130 is in Atlantic Ocean Region-East 101 (as shown in FIG. 1 in phantom), then it will receive the call, and the call is completed, as is known in the prior art.

However, if ship 130 has moved, for example, into Pacific Ocean Region 104, as shown in FIG. 1, then gateway switch 110 receives a signal indicating "unallocated number" from the Inmarsat system (e.g., UNN signal number 11 in CCITT 7 TUP signaling, signal number 10 in R2 signaling, and busy flash signal in C5 signaling). The caller will then hear an announcement indicating that the called ship, aircraft, or mobile terminal is turned off or operating in another region.

Using a system embodying this invention, the call can be completed even though the ship has moved out of the dialed region. Call processing begins with the dialing and routing of the call to gateway switch 110, as above. However, when gateway switch 110 receives the call, it proceeds differently. When gateway switch 110 receives the call, if the call is identified as coming from a mobile Inmarsat subscriber, the fuzzy database 116 will be updated to reflect the caller's current ocean region code. For calls going to Inmarsat subscribers, the switch performs a lookup in fuzzy database 116 in memory 114, using the ship code as a key, to determine if the ship is in database 116. If the ship is in database 116, then gateway switch 110 checks the last region code stored in database 116. If the region code matches the region code entered by the user, then the call is attempted in that region. If the region code does not match, then processor 112 replaces the region code in the call with the code of the last known region of the ship. If the ship is then successfully found, the call is completed. If the ship is not found in the region, then a further region code is tried. If the call is not successful on this try, then one of the other region codes is tried, until the call is completed or all region codes have been tried. If the call is completed, the fuzzy database 116 is updated with the successful region code, so that the next call attempt is more expeditiously routed to the last known region of the subscriber.

According to the exemplary embodiment of this invention, when the switch allocates a mobile subscriber, it updates its fuzzy database of ships. The size of the database may be large enough to serve all Inmarsat mobile subscribers (up to approximately 500,000) because all that needs to be stored is the ship code and the region code. The data may have an "aging" period which assumes that each ship usually returns to its base region. However, a gateway switch with limited storage choices can use whatever storage size is available. Once the storage space of the database is used up, the oldest data can be dropped to make space for new data.

The call completion technique of this invention has many advantages, including the fact that it can be fully developed on gateway switch 110 without a need for an adjunct processor and the resulting time delay expense while the switch dispatches a request and waits for results. Furthermore, the system can be used on some or all stored program gateway switches that process Inmarsat calls. Thus, there is no need for a centralized system that could become a bottleneck, and there is no need for additional software and hardware needed to interrogate such central database systems. Furthermore, the database is updated only when needed; that is, when a mobile subscriber is making or receiving a call. Finally, the calling party will not encounter any inconvenience or elongated call processing time. The call is attempted in another region as soon as the "unallocated number" signal is received, and before any ringing or ringback takes place. The caller will be unaware of this process.

Figure 2:
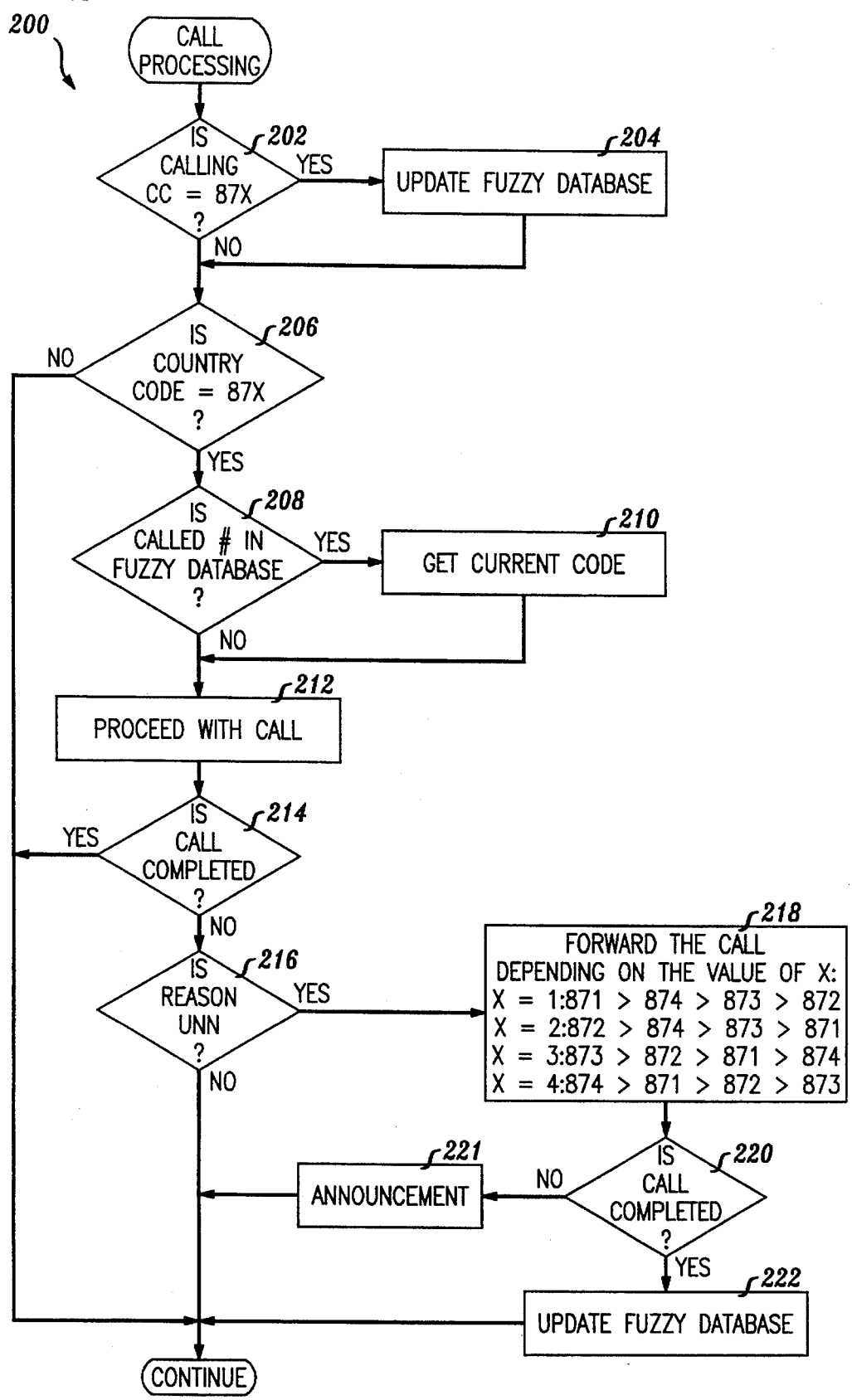
FIG. 2 is a flow chart showing implementation details for call processing as occurs in the gateway switch of FIG. 1.

Turning now to FIG. 2, call processing 200, as performed in processor 112, according to software stored in memory 114 of gateway switch 110 of FIG. 1 is shown. Call processing 200 enters as soon as an Inmarsat code (i.e., 871, 872, 873, 874) is recognized (in either the calling or the called number) by gateway switch 110. Call processing first checks in decision diamond 202, whether the country code (CC) of the calling party equals the 87X, which indicates an Inmarsat call. If it is, then the fuzzy database is updated in box 204.

Call processing from both decision diamond 202 and box 204 proceeds to decision diamond 206 where a determination is again made whether the CC of the called number is 87X. If the country code is not 87X, then the gateway switch 110 (FIG. 1) continues call processing normally. If the country code is 87X, which indicates an Inmarsat call, then call processing proceeds to decision diamond 208 where a check is made to determine if the called number is in fuzzy database 116 (FIG. 1). If the called number is in the fuzzy database, call processing proceeds to action box 210 where the current region code for that called number is retrieved.

If the called number is not in the fuzzy database, or the current region code has been retrieved, call processing proceeds to box 212 where a call is placed to the Inmarsat system using the country code to determine the region. Call processing continues to decision diamond 214 to determine if the call is completed to the indicated region. If the call is complete, then call processing continues in the normal fashion. If the call was not completed in decision diamond 214, then a determination is made whether the reason is UNN (unknown number). If the reason was not UNN in decision diamond 216, then call processing continues as in the prior art (i.e., an announcement is played).

If the reason in decision diamond 216 is UNN, then call processing proceeds to box 218 where the call is automatically tried with a different region code, depending on the value of X. If X=1, then call processing tries to complete the call using the region codes (874, 873, and then 872). If the region code was 2, then call processing tries 874, 873, and 871. If the region code was 3, then call processing tries 872, 871, then 874. Finally, if the last digit was 4, then call processing tries 871, 872, and then 873. If the call is completed, call processing continues to decision diamond 220 where a determination is made if the call is completed. If the call is not completed, a prerecorded announcement indicates that the called mobile subscriber is turned off. If the call is completed, then the fuzzy database is updated in box 222 and the call continues.

It is to be understood that the above-described embodiment is merely an illustrative principle of the invention and that many variations may be devised by those skilled in the art without departing from the scope of the invention. For example, many algorithms could be devised for determining which ocean region code to try next when the call cannot be completed due to an unallocated number. Further, the invention is applicable to mobile systems other than maritime, and could be applied to systems using land-based transmitter-receiver stations. It is, therefore, intended that such variations be included within the scope of the claims.

I claim:

1. A method, usable in a wireless communications system, for completing a wireless call to a mobile subscriber regardless of the region in which the subscriber is located, said wireless communications system comprising a gateway switch connected to a plurality of wireless transmission-receiver stations, each of said stations providing wireless service to a predefined region of the earth, and each of said stations having a unique region code which code is used to route call to subscribers served by that station, said method comprising the steps of:

A. receiving a call to said subscriber at said gateway switch, said call including one of said region codes;

B. said gateway switch extending said call to the one of said stations having said region code;

C. responsive to said gateway switch receiving a prespecified signal from said one station having said region code which indicates that the call cannot be completed to said subscriber, said gateway switch substituting another region code and extending said call to the other of said stations which has said substituted region code.

2. A method according to claim 1 further including, prior to Step B, the additional step of: inquiring of a local database at said gateway switch for the last entered region code corresponding to the subscriber identified by said received call; and including the routing of said call therein code provided b said database.

3. A method according to claim 1 wherein said transmitter-receiver station is located in a satellite and said extending step includes extending said call to an earth station associated with said satellite, said earth station providing the links to and from said satellite.

4. A method according to claim 1 wherein said steps B and C are repeated until the call is completed in one of said regions.

5. A method according to claim 4 wherein said gateway includes a database, said method further including the steps of:

completing said call to said subscriber; and updating said database with said subscriber's current region.

6. A method according to claim 1 wherein said steps B and C are repeated until all regions have been tried.

7. A method according to claim 6 wherein, after all regions have been tried, an announcement is played to a calling party.

8. A method according to claim 1 wherein said gateway includes a database, said method further including the steps of:

completing said call to said subscriber; and updating said database with said subscriber's current region.

9. A method according to claim 1 wherein said gateway includes a database, said method further including the step of:

responsive to receipt of a call originating with a subscriber, updating said database with said subscriber's current region.

10. A wireless communications system capable of completing a wireless call to a subscriber regardless of the region in which the subscriber is located, said wireless communications system comprising a gateway switch connected to a plurality of satellite earth stations, each of said earth stations having a unique region code and each of said earth stations being in communication with a satellite that provides wireless service to a predefined region of the earth, characterized by:

said gateway switch having means for extending an incoming call to the satellite earth station corresponding to a region code in a dialed telephone number and receiving a prespecified signal from said earth station having said region code wherein said prespecified signal indicates that the call cannot be completed to said subscriber; and said gateway switch having means for substituting another region code and extending said call to the one of said earth stations having said substituted region code.

11. A wireless system according to claim 10 wherein said means for substituting substitutes a further region code until the call is completed in one of said regions.

12. A wireless system according to claim 10 wherein said means for substituting includes a database, said means for substituting further comprising:

means for updating said database with said subscriber's current region when said call is completed.

13. A wireless system according to claim 10 wherein said gateway includes a database, said system further including:

means for updating said database with said subscriber's current region, responsive to receipt of a call originating with a subscriber.

* * * * *